United States Patent [19]
Fukuzawa

[11] Patent Number: 5,933,536
[45] Date of Patent: Aug. 3, 1999

[54] VARIABLE LENGTH CODE PROCESSOR AND IMAGE PROCESSOR HAVING AN INTEGRATED CODING/DECODING CIRCUIT

[75] Inventor: Yuji Fukuzawa, Saitama, Japan

[73] Assignee: Sony Corporation, Japan

[21] Appl. No.: 08/867,532

[22] Filed: Jun. 2, 1997

[30] Foreign Application Priority Data

Jun. 28, 1996 [JP] Japan .................................. 8-169003

[51] Int. Cl.[6] .................................................. G06T 9/00
[52] U.S. Cl. ........................ 382/246; 382/233; 382/245; 341/67
[58] Field of Search ............................ 341/67; 382/246, 382/233, 245; 358/427

[56] References Cited

U.S. PATENT DOCUMENTS

| | | | |
|---|---|---|---|
| 4,311,989 | 1/1982 | Roux | 341/86 |
| 4,870,662 | 9/1989 | Linbergh et al. | 375/240 |
| 5,245,338 | 9/1993 | Sun | 341/67 |
| 5,263,135 | 11/1993 | Dei | 345/502 |
| 5,550,541 | 8/1996 | Todd | 341/51 |
| 5,696,506 | 12/1997 | Yu | 341/67 |
| 5,767,799 | 6/1998 | Maertens et al. | 341/67 |

*Primary Examiner*—Kim Yen Vu
*Assistant Examiner*—David Rosenblum
*Attorney, Agent, or Firm*—Rader, Fishman & Grauer; Ronald P. Kananen

[57] ABSTRACT

In a variable length code processor or image processor for encoding data to be coded into a variable length code corresponding to its run length and level, and decoding a variable length code to be decoded into a corresponding run length and level, there are provided a first memory for storing a variable length coding table which outputs a variable length code using its run length and level as input, a first shifter which applies a bit shift to the variable length code output by the first memory based on its length, a second memory for storing a variable length decoding table which outputs a run length and level using a variable length code as input, and a second shifter which applies a bit shift to the variable length code to be decoded based on the length of the variable length code decoded on the immediately preceding occasion, and supplies it to the second memory as input. Due to the fact that the first and second shifters are identical, the processor may be made more compact and may be manufactured at lower cost.

20 Claims, 16 Drawing Sheets

FIG. 9A STORED CONTENTS OF FF 14

MSB ○○○○○ ...... ○○× LSB
⎯⎯⎯⎯⎯ 31 BITS ⎯⎯⎯⎯⎯ 1 BIT

FIG. 9B INPUT TO BARREL SHIFTER 6

○○○○○○ 6 BITS
××× ...... ××××× 26 BITS

FIG. 9C OUTPUT OF BARREL SHIFTER 6

32-5 BIT SHIFT

××○ 1 BIT
××××× ...... ×××××× 26 BITS
○○○○○ 5 BITS

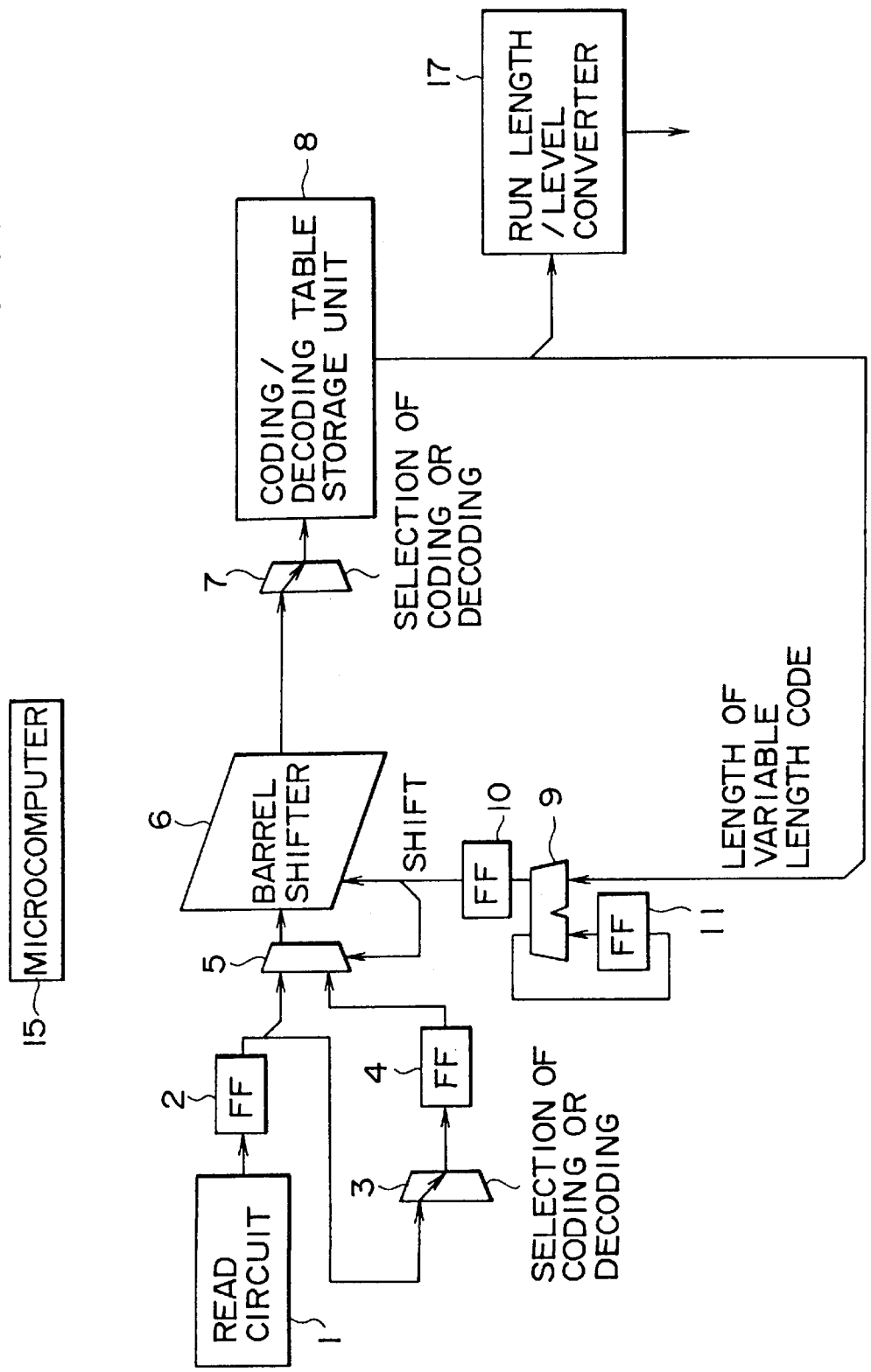

VARIABLE LENGTH CODE PROCESSOR AND IMAGE PROCESSOR HAVING AN INTEGRATED CODING/DECODING CIRCUIT

BACKGROUND OF THE INVENTION

1. Field of the Invention

This invention relates to a variable length code processor and image processor, and more particularly for example to a variable length code processor and image processor suitable for encoding and decoding of images, or variable length encoding and decoding of sound.

2. Description of the Related Art

When, for example, MPEG (Moving Experts Picture Group) coding is performed, image data is converted into DCT coefficients by DCT (Direct Cosine Transform), and after these DCT coefficients are quantized, they are variable length coded. In this variable length coding, a variable length code corresponding to a run length and level of a quantized DCT coefficient is output.

When MPEG decoding is performed, the aforesaid variable length code is variable length decoded, and converted into the run length and level of the quantized DCT coefficient. A quantized DCT coefficient is generated based on this run length and level, and the image is decoded by applying reverse quantization and reverse DCT.

FIG. 16 shows the layout of a conventional VLC (variable length coder) provided in an image encoder which performs this type of MPEG coding.

A coding table storage unit 61 stores coding tables containing variable length codes associated with combinations of run length and level. Run lengths and levels of quantized DCT coefficients are supplied to this unit. The coding table storage unit 61 outputs variable length codes corresponding to run length and level, using run length and level as input.

In other words, the coding table storage unit 61 reads a variable length code stored in an address which is a run length and level combination input to the unit. This variable length code is supplied to a barrel shifter 62.

In addition to the variable length code, the length of this code is also contained in the coding table. The length of the variable length code supplied to the barrel shifter 62 is read from the coding table storage unit 61, and supplied to a controller 64.

Herein, the word width of the variable length codes stored in the coding table is, for example, identical to the maximum length L of the variable length codes. Variable length codes shorter than L are, for example, lengthened to L bits by placing 0B (where B indicates a binary number) in the upper bits. Therefore when the length of the variable length code corresponding to a given run length and level combination is i (<=L), the output of the coding table storage unit 61 has L-i ×0B added to the upper bits of the variable length code. Therefore to output continuous variable length code sequences as the coding result, the L-i×0B added to the upper bits must be removed from the output of the coding table storage unit 61.

The output of the coding table storage unit 61 is bit-shifted in the barrel shifter 62. As a result, the MSB (uppermost bit) of the variable length code contained in the present output of the coding table storage unit 61 is moved to a position one bit below the lowermost bit (LSB) of the variable length code contained in the output of the coding table storage unit 61 on the immediately preceding occasion.

The controller 64 computes a bit shift in the barrel shifter 62 based on the length of the variable length code received from the coding table storage unit 61, and supplies this to the barrel shifter 62. The barrel shifter 62 bit-shifts the output of the coding table storage unit 61 based on the bit shift from the controller 64, and outputs the result to a FF (flip-flop) 63.

When the barrel shifter 62 comprises N (>=L) bits, the FF 63 comprises N flip-flops which latch each of the N bits output by the barrel shifter 62.

Here, it shall be assumed that the LSB is the 0th bit, the next bit up is the first bit, the second next bit up is the second bit, and so on. It shall also be assumed that the variable length code is already continuously latched from the mth (<N) bit to the MSB (Nth bit) of the FF 63.

In this case, the output of the coding table storage unit 61 is bit-shifted so that the MSB of the variable length code is the m−1th bit, and the result is output to the FF 63. The FF 63 latches the output of the barrel shifter 62 under the control of the controller 64, and in this case, the controller 64 operates only the flip-flop which latches the m−1th bit and lower bits.

Therefore only the m−1th bit and lower bits in the output of the barrel shifter 62 are latched in the FF 63, and the variable length code (variable length code sequence) wherein the mth bit and upper bits are latched is attached without modification to this variable length code output by the barrel shifter 62.

Subsequently, this processing is repeated, and when a variable length code sequence comprising N bits is latched in the FF 63, the controller 64 controls the FF 63 so as to output this N bit variable length code sequence.

In this way, a variable length code sequence comprising continuous variable length codes is output in N bit units from the VLC.

Next, FIG. 17 shows the layout of a typical VLD (variable length decoder) which decodes variable length codes output by the VLC of FIG. 16.

Variable length codes are temporarily stored in a buffer 71, and for example are read in N bit units. This N bit variable length code sequence is supplied to a barrel shifter 72 comprising N bits.

For example, when a variable length code is arranged from the MSB to the pth bit of the N bit variable length code sequence, and the next variable length code is arranged with the following p−1th bit at the head, the barrel shifter 72 outputs the N bit variable length code sequence from the buffer 71 to a decoding table storage unit 73.

The decoding table storage unit 73 stores a decoding table containing run length and level combinations associated with variable length codes, and it outputs corresponding run lengths and levels using the output of the barrel shifter 72 as input.

In other words, the decoding table storage unit 73 decodes the output of the barrel shifter 72, and it outputs run lengths and levels stored in addresses which are the decoded results.

In addition to run length and level, the decoding table also contains the lengths of the variable length codes corresponding to these run lengths and levels. The lengths of the variable length codes corresponding to the run lengths and levels output as decoded results are supplied by the decoding table storage unit 73 to the controller 74.

The MSB of a variable length code to be decoded must be placed at the MSB in the output of the barrel shifter 72 which is input as an address to the decoding table storage unit 73.

For this reason, the N bit variable length code sequence read from the buffer 71 is bit-shifted in the barrel shifter 72, and the MSB of the variable length code to be decoded next is moved to the position of the MSB of the barrel shifter 72.

In other words, the controller 74 computes a bit shift in the barrel shifter 72 according to the length of the variable length code received from the decoding table storage unit 73, and supplies it to the barrel shifter 72. The barrel shifter 72 applies a bit shift to the N bit variable length code sequence according to the bit shift from the controller 74, and outputs the result to the decoding table storage unit 73.

Hence, N bits of data at the head of a variable length code which was placed at the p–1th bit of an N bit variable length code sequence is supplied to the decoding table 73 from the barrel shifter 72, and then variable length decoded in the same way to a run length and level.

When the decoding of the N bit variable length code sequence stored in the barrel shifter 72 is complete, the next N bit variable length code sequence is read from the buffer 71 and this processing is thereafter repeated.

In this way, the VLD outputs a variable length code sequence in which variable length codes are continuously joined together, as a variable length decoded run length and level.

However according to the prior art, for example in a video recorder which could encode and decode MPEG coded images, the aforesaid VLC and VLD were provided separately, so the device became bulky and costly.

In particular, the barrel shifter is physically large and its price is comparatively high, so when such a barrel shifter was installed in both the VLC and VLD, it had a large impact on the scale and cost of the whole device.

SUMMARY OF THE INVENTION

This invention, which was conceived in view of this situation, therefore aims to make a variable length code processor and image processor more compact and economical.

The variable length code processor and image processor according to this invention comprise a first shifter which applies a bit shift to a variable length code output by a first memory which stores a variable length coding table for outputting a variable length code using a run length and level as input, based on the length of this code, and a second shifter which applies a bit shift to a variable length code to be decoded based on the length of the code decoded on the immediately preceding occasion, and supplies the result as input to a second memory which stores a variable length decoding table for outputting a run length and level using the variable length code as input, the first and second shifters being identical.

BRIEF DESCRIPTION OF THE DRAWINGS

FIG. 9 comprising FIG. A, FIG. B and FIG. C is a block diagram describing processing performed by a selection circuit 13 in FIG. 4.

FIG. 10 is a block diagram for describing processing performed during variable length decoding according to the embodiment of FIG. 4.

DETAILED DESCRIPTION OF THE PREFERRED EMBODIMENTS

This invention will now be described in more detail.

Figure 1:
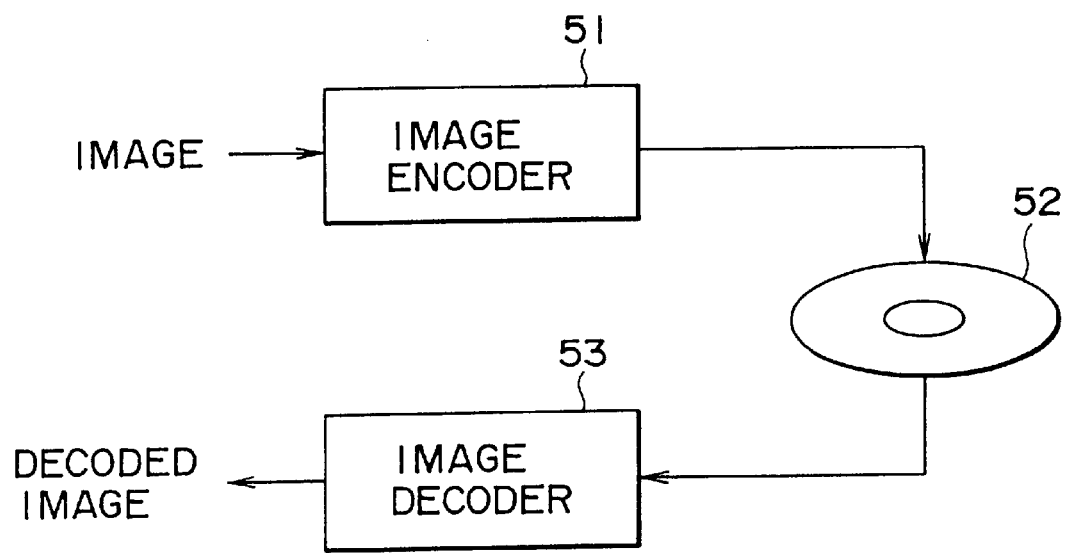
FIG. 1 is a block diagram showing a typical layout of a video recorder to which this invention is applied.

FIG. 1 shows the layout of one type of video recorder to which this invention is applied. In an image encoder 51, images to be recorded on a recording medium 52 are encoded, for example by MPEG. The data encoded by this image encoder 51 is stored on the recording medium 52, which for example may be a magnetic tape, magnetic disc or optical disk (e.g. DVD, Digital Versatile Disc). In an image decoder 53, the recording medium 52 is played back, and the playback data is MPEG decoded. The decoded images obtained by decoding in the image decoder 53 are supplied to a monitor, not shown.

Figure 2:
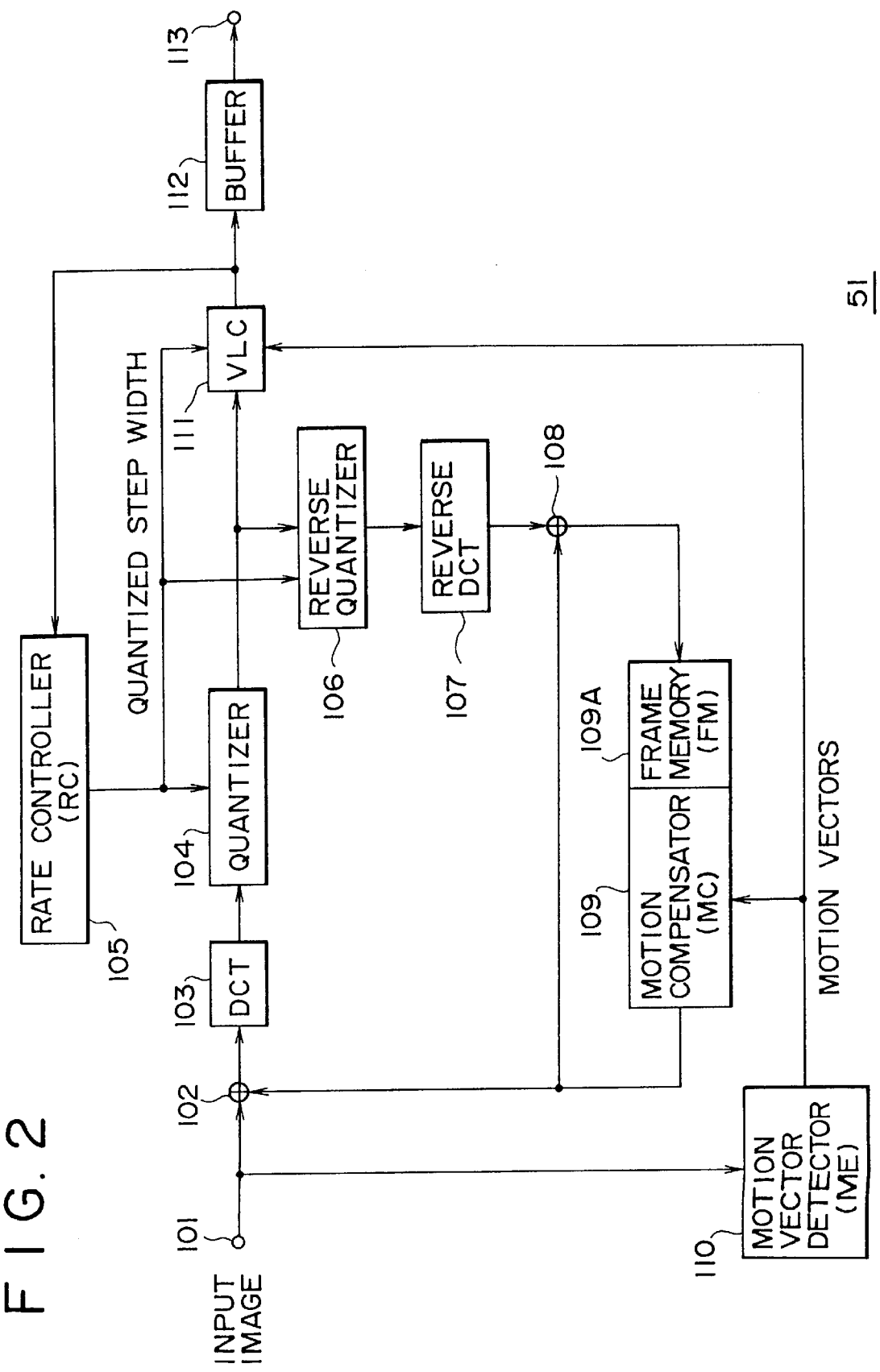
FIG. 2 is a block diagram showing a typical layout of an image encoder 51 of FIG. 1.

FIG. 2 shows a typical layout of the image encoder of FIG. 1. In this encoder, images (moving images) are MPEG (Moving Picture Experts Group) encoded. A digitized moving image signal is input to a terminal 101, and this moving image signal is supplied to a computer 102 and motion vector detector (ME) 110. In the motion vector detector 110, interframe motion vectors in the input moving image signal are detected.

In the motion vector detector 110, motion vectors are detected by for example pattern matching between a reference frame and small blocks of 16 pels×16 lines (macroblocks) in the frame currently being encoded. More specifically, a motion vector is detected which minimizes an absolute value sum $E_f$ expressed by the following equation:

$$E_f = S|A_{ij} - F_{ij}|$$

where for example the value of the pel which is ith from the extreme left and jth from the top is $A_{ij}$, and the value of a pel comprising the 16×16 block in a reference frame referred to by any motion vector is $F_{ij}$.

S in the above equation expresses that i and j are summed for integers in a range of 1 to 16.

The motion vectors detected in the motion vector detector 110 are supplied to a motion compensator (MC) 109 and VLC (variable length coder) 111. The motion vector compensator 109 comprises a frame memory (FM) 109A, reads locally decoded image signals stored in the frame memory 109A based on the motion vectors from the motion vector detector 110, and supplies the result in the form of predicted image signals to the computer 102 and a computer 108. Specifically, the motion compensator 109 sets addresses read from the frame memory 109A to addresses which are shifted by amounts corresponding to motion vectors from the addresses corresponding to the macroblock which is being encoded. Image signals are read from these addresses, and supplied to the computers 102 and 108.

The computer 102 calculates a difference between the macroblock being coded input from the terminal 101 and the predicted signal supplied from the motion vector compensator 109; and a difference signal obtained as a result is supplied to a DCT (Discrete Cosine Transform) 103. It should be noted that when for example coding starts or there is a scene change, the predicted difference signal is large and prediction efficiency is low, so in these cases macroblocks are intraframe coded. Macroblocks which are intraframe coded are supplied to the DCT 103 without being modified when they pass through the computer 102.

In the DCT 103, two-dimensional DCT processing is applied to the output of the computer 102. The DCT coefficients thereby obtained are for example "zig-zag" scanned, and supplied to a quantizer 104. In the quantizer 104, DCT coefficients from the DCT 103 are quantized based on a quantizing step width supplied from a rate controller (RC) 105, and the resulting quantized coefficients are supplied to a reverse quantizer 106 and VLC 111.

The VLC 111 detects run length and level from the quantized coefficients, i.e. quantized DCT coefficients, from the quantizer 104, and then generates and outputs variable length codes corresponding to combinations of this run length and level (i.e. it performs variable length coding and outputs the result). In the VLC 111, this variable length coding is performed on both quantized step widths and motion vectors for each macroblock supplied respectively from the rate controller 105 and motion vector detector 110. The encoded data (variable length codes) output from the VLC 111 is supplied to a buffer 112. By temporarily storing the coded data from the VLC 111, the buffer 112 absorbs bit amount fluctuations (data amount fluctuations), and outputs a bit stream for example at a constant bit rate from a terminal 113.

The encoded data output by the VLC 111 is fed back to the rate controller 105, and the rate controller 105 thereby monitors the bit amount of encoded data output by the VLC 111. When the buffer 112 is likely to overflow, the rate controller 105 increases the quantizing step width, conversely when the buffer 112 is likely to underflow, the quantizing step width is decreased before data is supplied to the quantizer 104. In this way, overflow and underflow of the buffer 112 is avoided.

The quantizing step width output by the rate controller 105 is supplied not only to the quantizer 104, but also to the reverse quantizer 106 and VLC 111.

In the reverse quantizer 106, quantized coefficients supplied from the quantizer 104 are reverse quantized with an identical quantizing step width to the quantizing step width supplied by the rate controller 105, i.e. to the quantizing step width used in the quantizer 104, and the DCT coefficients thus obtained are supplied to a reverse DCT 107. In the reverse DCT 107, reverse DCT is performed on the DCT coefficients from the reverse quantizer 106, and the result is supplied to the computer 108.

In addition to the output of the reverse DCT 107, the same data as the predicted image supplied to the computer 102 is supplied to the computer 108 from the motion compensator 109, and the computer 108 locally decodes the original image by adding the signal from the reverse DCT 107 (predicted difference signal) to the predicted image from the motion compensator 109 (however when intraframe coding is performed in the image encoder, the output of the reverse DCT 107 is supplied to the frame memory 109A without being modified by the computer 108). This decoded image is identical to the decoded image obtained on the receiving side.

The decoded image obtained in the computer 108 is supplied to the frame memory 109A where it is stored, and is then used as a reference image (reference frame) for interframe coded images.

Figure 3:
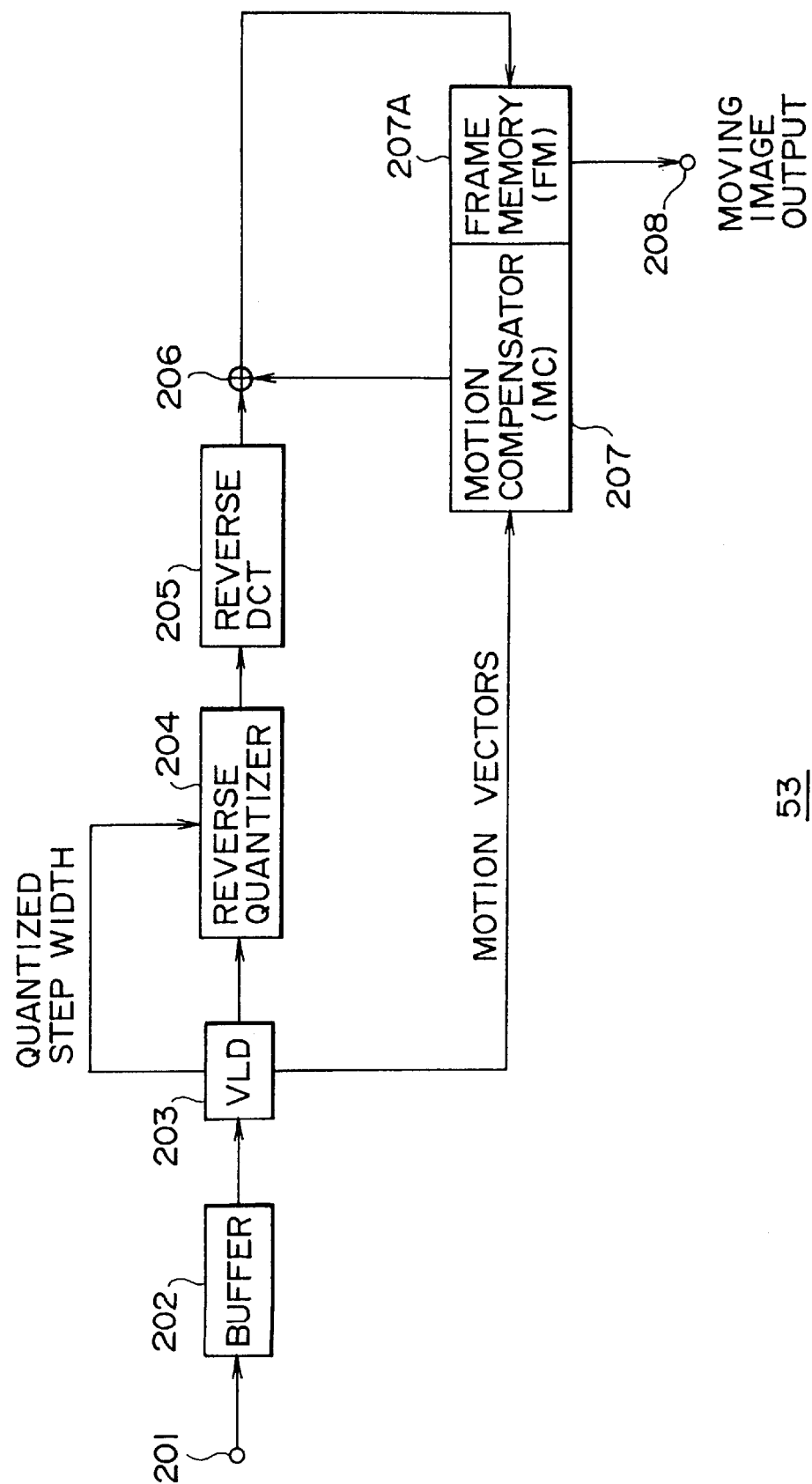
FIG. 3 is a block diagram showing a typical layout of an image decoder 53 of FIG. 1.

FIG. 3 shows the layout of the image decoder 53.

Playback data (encoded data) from the recording medium 52 is input to a terminal 201. This encoded data is supplied to a buffer 202, and is temporarily stored. The encoded data stored in the buffer 202 is supplied to a VLD (variable length decoder) 203, and variable length decoding takes place. A quantized coefficient (quantized DCT coefficient) and quantized step width for each macroblock obtained by variable length decoding in the variable length decoder are supplied to a reverse quantizer 204, and a motion vector is supplied to a motion compensator 207. It may be noted that what is obtained by variable length coding in the VLD 203 is the run length and level of the quantized DCT coefficient, but the VLD 203 converts this run length and level to the quantized DCT coefficient (quantized coefficient) which is supplied to the reverse quantizer 204.

The reverse quantizer 204 applies reverse quantization to the quantized coefficient from the VLD 203 based on the quantizing step width also supplied by the VLD 203, and the resulting DCT coefficient is output to a reverse DCT 205. The reverse DCT 205 performs reverse quantization on the DCT coefficient from the reverse quantizer 204, and the result is supplied to a computer 206.

In addition to the output of the reverse DCT 205, the output of the motion compensator 207 is also supplied to the computer 206. The motion compensator 207 comprises a frame memory 207A. As in the case of the motion compensator 109 in FIG. 5, predicted image signals are read from the frame memory 207Abased on motion vectors from the VLD 203, and these are supplied to the computer 206. The computer 206 decodes the original image by adding the signal from the reverse DCT (predicted difference signal) and the predicted image from the motion compensator 207, and supplies the result to the frame memory 207A (however when the output of the reverse DCT 205 is intraframe coded, the output is supplied to the frame memory 207A without being modified by the computer 206).

The decoded image stored in the frame memory 207A is used as a reference image for the images which are subsequently decoded, read when required, and displayed on a monitor, etc.

Next, the VLC 111 forming part of the image encoder 51 of FIG. 2, and the VLD 203 forming part of the image decoder 53 of FIG. 3, will be described in further detail. According to this invention, the VLC 111 and VLD 203 are formed in a one-piece construction which allows the device (video recorder) to be made more compact and less costly.

Figure 4:
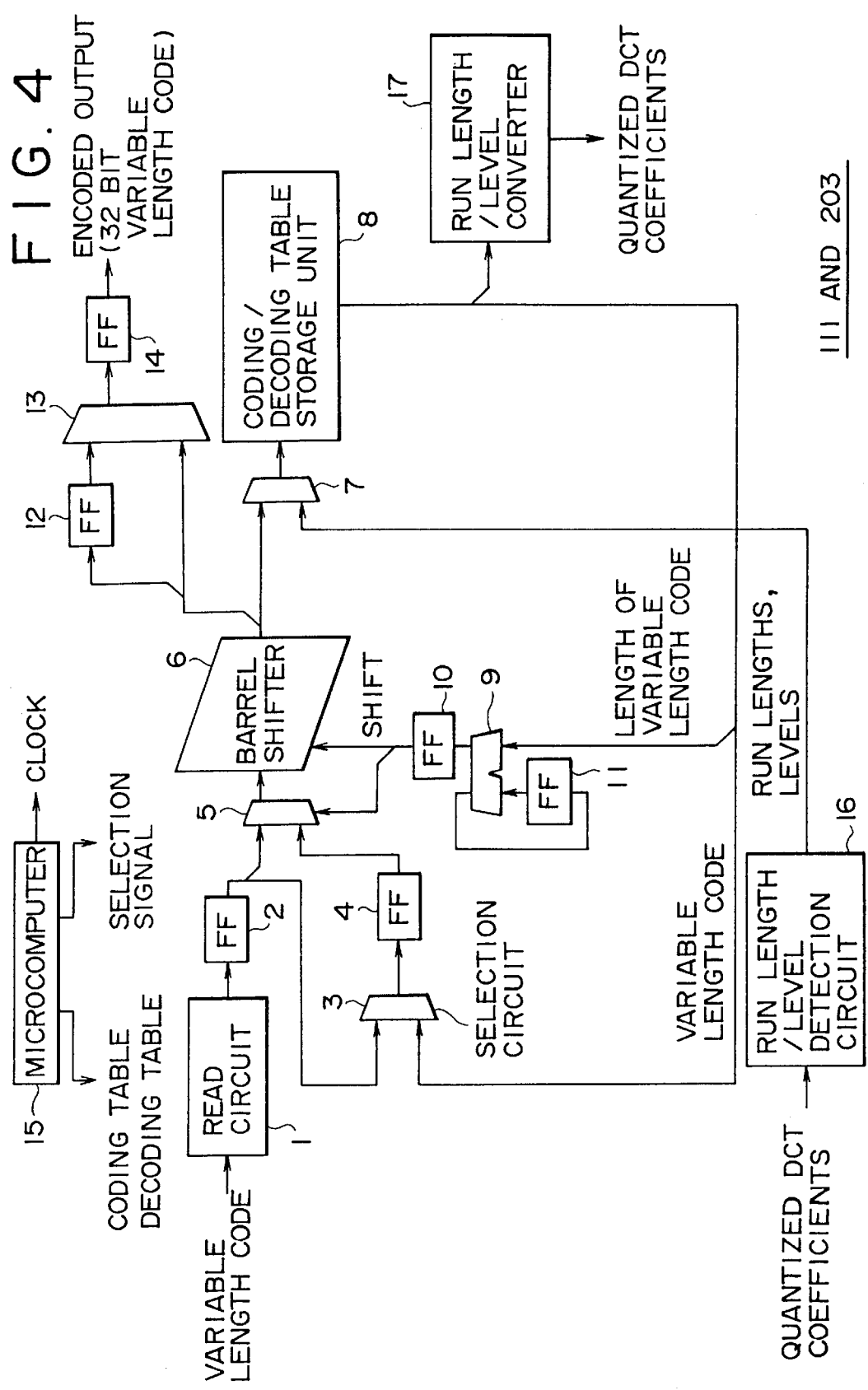
FIG. 4 is a block diagram showing a typical layout of a VLC 111 in FIG. 2 and a VLD 203 in FIG. 3.

FIG. 4 shows a typical layout of the VLC 111 and VLD 203.

A read circuit 1 reads a variable length code in N bit units from the buffer 202 (FIG. 3), and supplies the result to a FF 2. The FF 2 comprises N flip-flops, temporarily stores a N bit variable length code sequence supplied by the read circuit 1, and supplies the result to a selection circuit 3 or 5. The selection circuit 3 selects either the output of the FF 2 or the output of a coding/decoding table storage unit 8, and supplies the result to a FF 4. The FF 4 comprises N flip-flops, temporarily stores the output of the selection circuit 3, and supplies the result to the selection circuit 5. When necessary, the selection circuit 5 selects either the output of the FF 2 or the FF 4 according to a shift from a FF 10, and supplies N bits of data (variable length code sequence) to a barrel shifter 6.

The barrel shifter 6 is a N bit barrel shifter which latches N bits of data from the selection circuit 5, and applies a bit shift according to a shift supplied by the FF 10. When necessary, the shift result of the barrel shifter 6 is supplied to a selection circuit 7, a FF 12 or a selection circuit 13.

The barrel shifter 6 performs a so-called rotation. In other words, when the barrel shifter 6 performs a left shift, it does not discard the MSB, but shifts the MSB to the LSB, and when it performs a right shift, it does not discard the LSB but shifts the LSB to the MSB.

The selection circuit 7 selects either the output of the barrel shifter 6 or the output of a run length/level detecting circuit 16, and supplies the result to the coding/decoding table storage unit 8.

The coding/decoding table storage unit 8 for example comprises a rewritable RAM (Random Access Memory), and stores a coding table and decoding table. When coding is performed the coding table is supplied, and when decoding is performed the decoding table is supplied from the microcomputer 15 to the coding/decoding table storage unit 8, and either the coding table or decoding table are stored depending on the case. The storage capacity of the coding/decoding table storage unit 8 therefore does not have to be large enough to store both the coding table and decoding table, it being sufficient that its storage capacity is large enough to store the larger of the two tables. Also, as the coding/decoding table storage unit 8 is rewritable, provision may easily be made for coding systems other than those specified in MPEG simply by updating the tables stored therein (i.e. without replacing the coding/decoding table storage unit 8).

In the coding table (variable length coding table), variable length codes such as those for example specified in MPEG are stored together with corresponding run lengths and levels, and when a run length and level are supplied as input, a variable length code stored in the corresponding address is read and output. In the decoding table (variable length decoding table), run lengths and levels are stored together with corresponding variable length codes, and when a variable length code is supplied as input, a run length and level stored in the corresponding address is read and output.

The length of the variable length code is stored in both the coding table and decoding table. In the case of the coding table, the variable length code is output together with its length, and in the case of the decoding table, the run length and level are output together with the length of the corresponding variable length code.

In the coding/decoding table storage unit 8, the length of the variable length code read from the coding table is supplied to the selection circuit 3 or a shift adder 9. The run length and level combination or the length of the variable length code read from the decoding table is supplied to a run length/level converter 17 or the shift adder 9.

The shift adder 9 adds the length of the variable length code supplied from the coding/decoding table storage unit 8 and a stored value in a FF 11, and outputs the result to the FF's 10 and 11. The FF 10 temporarily stores the value output by the shift adder 9, and supplies it to the selection circuit 5 and barrel shifter 6. The FF 11 temporarily stores the value output by the shift adder 9, waits until the length of the variable length code is output by the coding/decoding table storage unit 8, and then supplies these values to the shift adder 9.

Therefore, the shift adder 9 and FF 11 perform a cumulative addition on the lengths of variable length codes.

When the bit number N of the barrel shifter 6 is equal to $2^K$ (where K is an integer), the shift adder 9 comprises K bit adders, so when a cumulative addition product S is $2^K$ or more, $S-2^K$ is output.

The FF 12 temporarily stores the output of the barrel shifter 6. The selection circuit 13 selects either the output of the barrel shifter 6 or the output of the FF 12, and supplies the result to a FF 14. The FF 14 comprises N flip-flops, and latches required bits in the output of the selection circuit 14. When a continuous variable length code of 32 bits is stored, this 32 bit variable length code is output.

The microcomputer 15 controls the blocks comprising the VLC 111 and VLD 203. Specifically, the microcomputer 15 for example supplies a clock pulse to these blocks and operates them. The microcomputer 15 also for example supplies the coding table during coding and the decoding table during decoding to the coding/decoding table storage unit 8 so that they are stored. Further, the microcomputer 15 for example selects the input to be selected by supplying selection signals to the selection circuits 3, 5, 7, 13.

The run length/level detection circuit 16 detects the run lengths and levels of DCT coefficients (quantized DCT coefficients) in, for example, macroblock units, which are supplied by the quantizer 104 (FIG. 2). The run lengths and levels detected by the run length/level detection circuit 16 are supplied to the selection circuit 7.

The run length/level converter 17 converts the run lengths and levels supplied by the coding/decoding table storage unit 8 into quantized DCT coefficients by performing a reverse processing to that of the run length/level detection circuit 16, and supplies the result to the reverse quantizer 204 (FIG. 3).

The operation of this processor will now be described.

First, the variable length coding process will be described with reference to FIG. 5 to FIG. 9.

Figure 5:
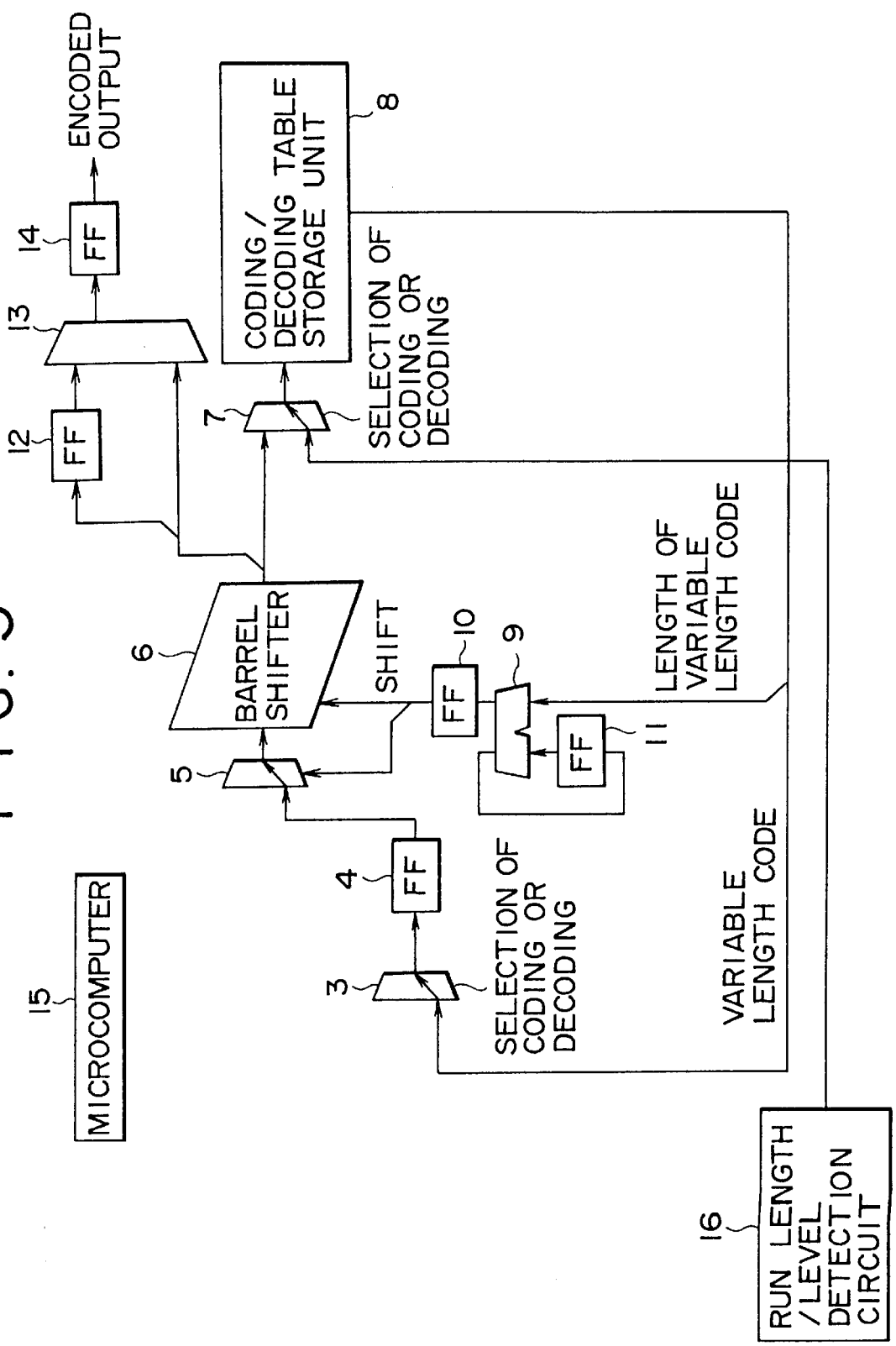
FIG. 5 is a block diagram describing processing performed during variable length coding according to the embodiment of FIG. 4.

FIG. 5 shows a block which is active when the coding side of the VLC 111 and VLD 203 shown in FIG. 4 is operated.

During coding, the microcomputer 15 first supplies a coding table to the coding/decoding table storage unit 8 which stores it, the selection circuit 3 is controlled so as to select the output of the coding/decoding table storage unit 8, and the selection circuit 5 is controlled so as to select the output of the FF 4. The microcomputer 15 also controls the selection circuit 7 so as to select the output of the run length/level detection circuit 16.

In the run length/level detection circuit 16, the run lengths and levels of DCT coefficients are detected, and supplied to the selection circuit 7. Under the control of the microcomputer 5, the output of the run length/level detection circuit 16 is selected, and the run lengths and levels are supplied to the coding/decoding table storage unit 8 by the run length/level detection circuit via the selection circuit 7.

In the coding/decoding table storage unit 8, a variable length code and its length which are stored in an address corresponding to a run length and level from the selection circuit 7 are read, then the variable length code and the length of the variable length code are supplied respectively to the selection circuit 3 and the shift adder 9.

Under the control of the microcomputer 15, the selection circuit 3 selects the output of the coding/decoding table storage unit 8, and the variable length code is thereby supplied to the FF 4 via the selection circuit 3.

Herein, the variable length code is stored in the FF 4 (FF 4 comprising N flip-flops) for example from the right (i.e. from the LSB). When the output of the coding/decoding table storage unit 8 is less than N bits, its upper bits maybe adjusted to for example, 0B (in MPEG, the maximum bit number of a coded output is specified as 28 bits, therefore when the word width of the variable length code stored in the coding table is for example 28 bits and the FF 4 comprises for example 32 bits, 4 ×0B bits are added to the upper bits of the 28 bit variable length code so as to make 32 bits). All variable length codes are thereby adjusted to a fixed N bits of data (referred to hereafter for convenience as a N fixed bit variable length code).

The N fixed bit variable length code stored in the FF 4 is output to the selection circuit 5. Under the control of the microcomputer 15, the selection circuit 5 selects the output of the FF 4, and the N fixed bit variable length code is thereby supplied from the FF 4 to the barrel shifter 6 via the selection circuit 5.

In the shift adder 9, the length of the variable length code is cumulatively added to the variable length code supplied by the coding/decoding table storage unit 8 by adding the stored value in the FF 11. This cumulative addition product is stored in the FF's 10 and 11. The cumulative addition product stored in the FF 10 is supplied to the barrel shifter 6 as a shift amount, and the cumulative addition product stored in the FF 11 is supplied to the shift adder 9 so as to compute the next cumulative addition product.

The barrel shifter 6 receives a shift S from the FF 10, the stored N fixed bit variable length code is left-shifted (towards the MSB) by N-S bits and the shift result is supplied to the FF 12 and selection circuit 13. The FF 12 temporarily stores the output of the barrel shifter 6 and outputs it to the selection circuit 13.

The selection circuit 13 is controlled by the microcomputer 15, and under this control, selects the output of either the barrel shifter 6 or the FF 12 so as to supply it to the FF 14.

When the output of the barrel shifter 6 is selected and supplied by the selection circuit 13, the FF 14 performs the following processing.

The FF 10 sums the shifts stored by the FF 10. If the length of the variable length code supplied by the coding/decoding table storage unit 8 to the shift adder 9 (therefore, the length of the variable length code which has been bit-shifted in the barrel shifter 6) is s, the FF 14 activates only the flip-flops of the bits lower than the upper N-s bits of the N flip-flops comprising it. Therefore in this case, in the FF 10, the upper S-s bits (the bits from the MSB to the N- (S-s) th bit) are retained without modification, while the bits from the N-(S-s)-1st bit to the LSB of the output of the barrel shifter 6 are stored again.

When variable length codes have been continuously stored for all the N bits, the FF 14 outputs this N bit variable length code sequence.

When the output of the FF 12 is selected and supplied by the selection circuit 13, the FF 14 latches it without modification.

Next, the processing performed during coding will be described in further detail using specific values.

If for example 15 is stored as the cumulative addition product in the FF 13, variable length codes are continuously stored from the MSB to the upper 15th bit in the FF 14. Here, it shall be assumed that the variable length code sequence stored from the MSB to the upper 15th bit of the FF 14 is 100001000110110B.

It shall be assumed also that N is 32 (=$2^5$). In this case therefore, the shift adder 9 comprises 5 bit adders.

Figure 6:
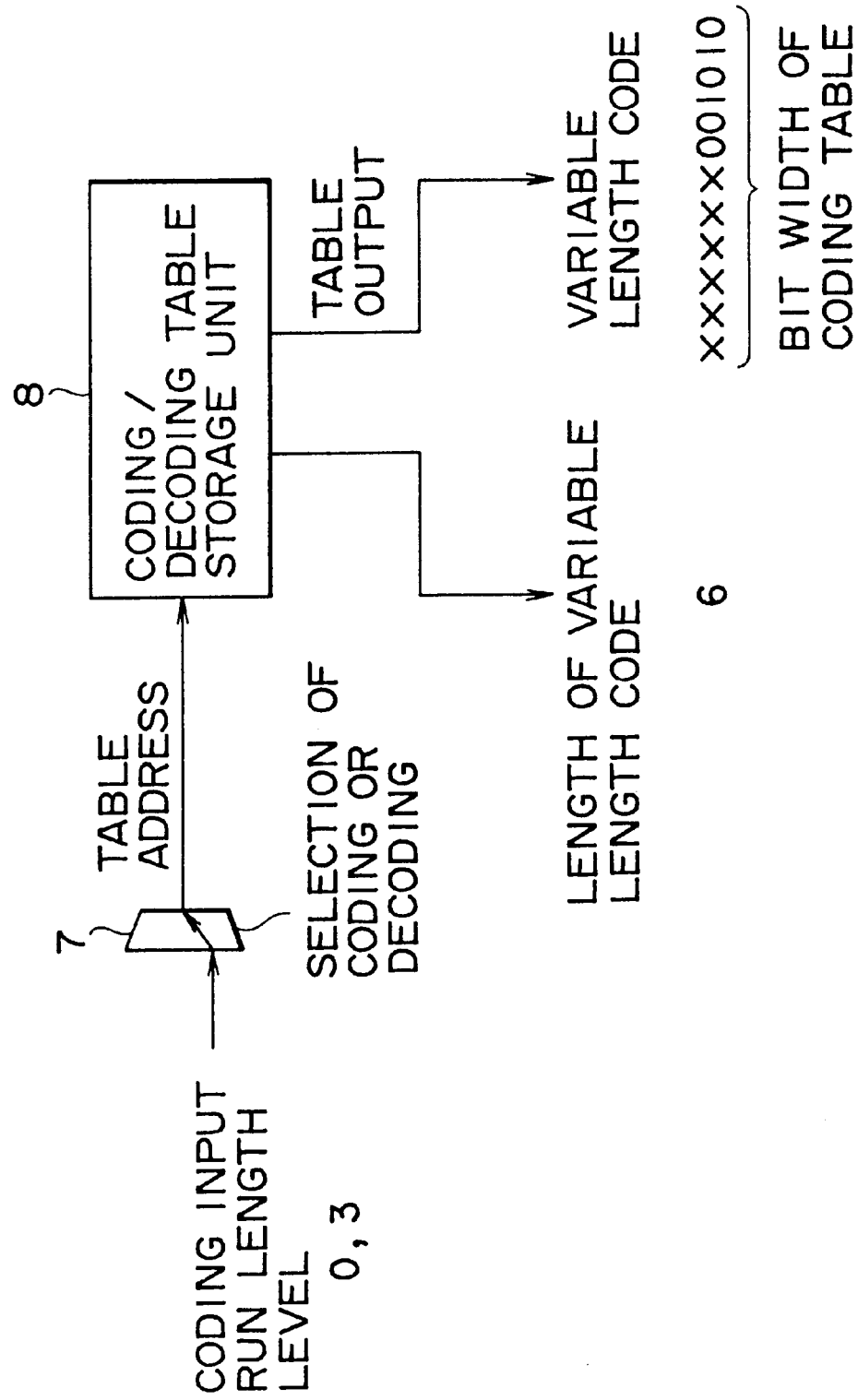
FIG. 6 is a block diagram describing processing performed during variable length coding according to the embodiment of FIG. 4.

Assuming now that, as shown in FIG. 6, a run length and level of respectively 0 and 3 are supplied to the coding/decoding table storage unit 8 from the run length/level detection circuit 16 via the selection circuit 7, and a variable length code [xx . . . x001010B] corresponding to the combination of this run length [0] and level [3] and its length [6] are output. The lower 6 bits [001010B] of the variable length code [xx . . . x001010B] are a variable length code corresponding to the combination of run length [0] and level [3], and the x's are "dummy bits" to make the variable length code correspond with the word width of the coding table.

Figure 7:
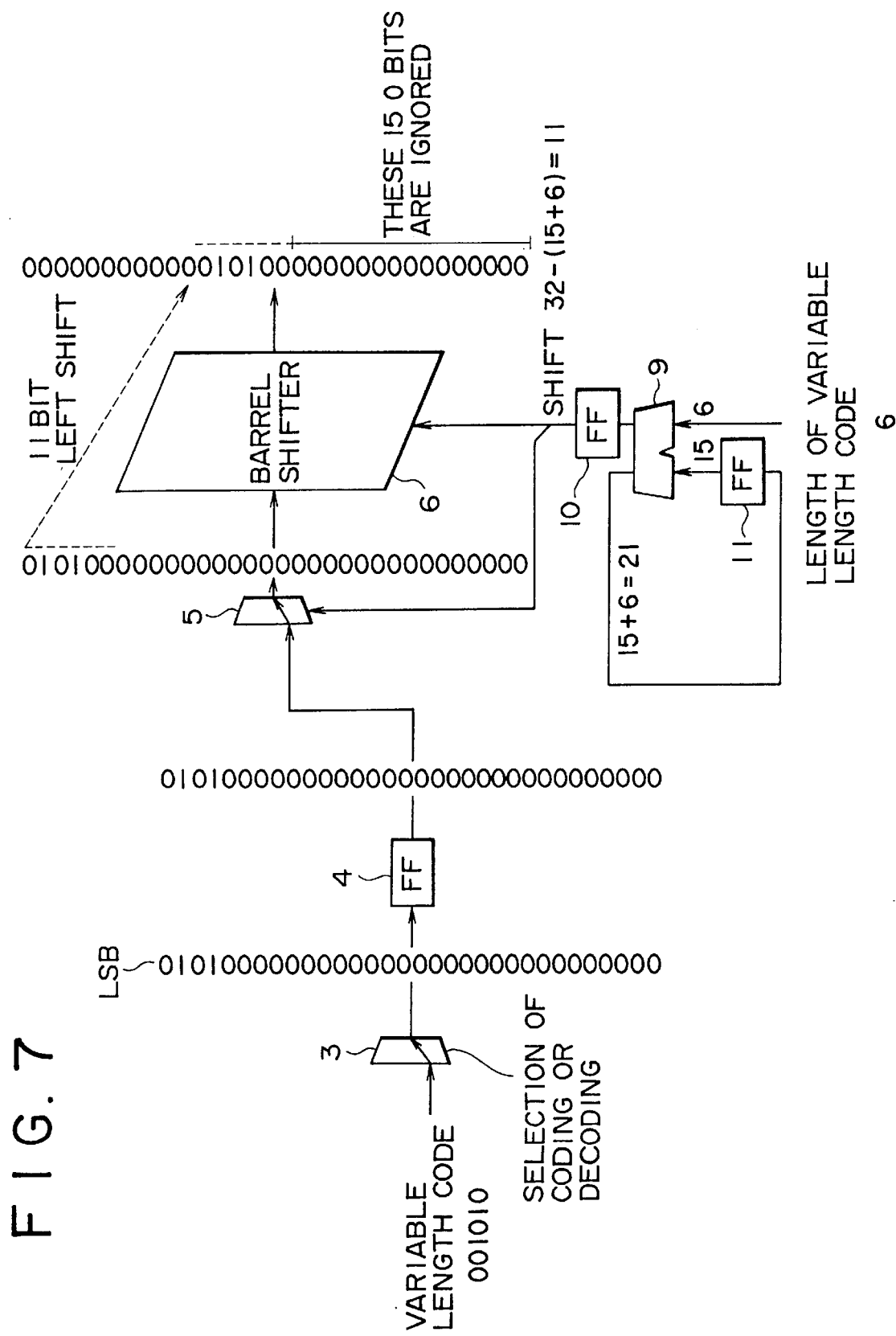
FIG. 7 is a block diagram describing processing performed during variable length coding according to the embodiment of FIG. 4.

In this case, as shown in FIG. 7, a 32 bit fixed variable length code [00000000000000000000000000001010B] in which 26 0B's are added to the upper bits of the variable length code [001010B], is supplied to and stored by the barrel shifter 6 via the selection circuit 3, FF 4 and selection circuit 5.

At the same time, the length [6] of the variable length code is supplied to and added to the stored value [15] of the FF 11 in the shift adder 9. The shift [21 (=15+6)] which is thereby obtained as an addition product is supplied to the FF 11, and supplied to the barrel shifter 6 via the FF 10.

When the shift [2] is received, the barrel shifter 6 shifts the 32 bit fixed variable length code to the left by 11 (=32–21) bits, and this shift result is supplied to the FF 12 and selection circuit 13. The FF 12 temporarily stores the output of the barrel shifter 6.

In this case therefore, the 32 bit fixed variable length code [00000000000000000000000000001010B] left-shifted by 11 bits (referred to hereafter for convenience as 32 bit shift data) is supplied by the barrel shifter 6 to the selection circuit 13, and the same data is stored in the FF 12.

In this case, the selection circuit 13 selects the output of the barrel shifter 6, and supplies it to the FF 14.

When the output of the barrel shifter 6 is selected and supplied by the selection circuit 13, the FF 14 adds the lower bits from the 16th bit from the MSB, to the 15 bit variable length code [100001000110110B] already stored from the MSB.

Figure 8:
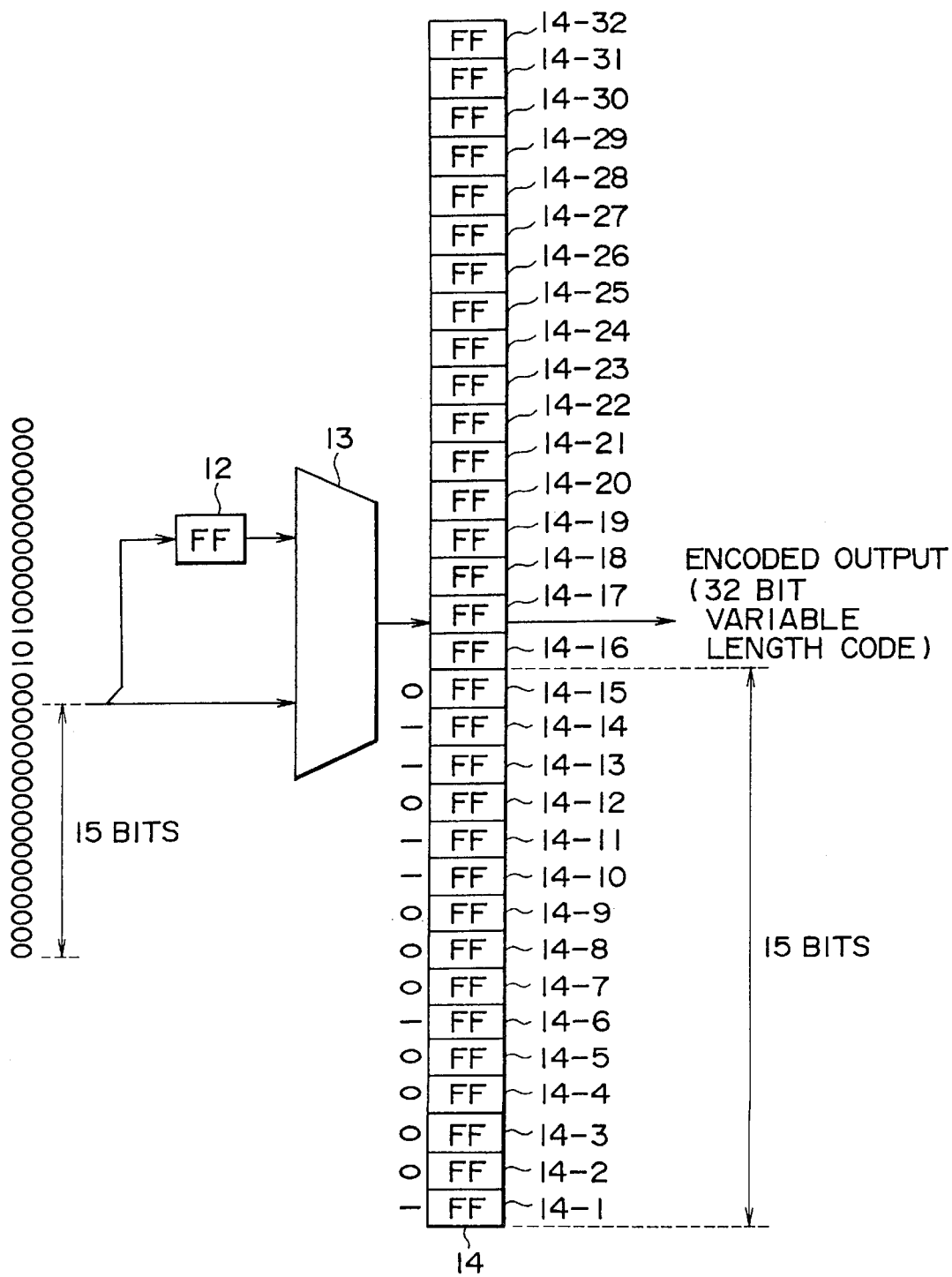
FIG. 8 is a block diagram showing a typical layout of a FF 14 of FIG. 4.

As shown in FIG. 8, the FF 14 comprises 32 flip-flops (FF), 14-1 to 14-32 (assuming that the flip-flop 14-1 corresponds to the MSB, and the flip-flop 14-32 corresponds to the LSB). In the present case, 1B, 0B, 0B, 0B, 0B, 1B, 0B, 0B, 0B, 1B, 1B, 0B, 1B, 1B, 0B are respectively stored in the flip-flops 14-1 to 14-11.

When the 32 bit shift data [00000000000000000101000000000000B] is supplied by the selection circuit 13, the FF 14 does not activate the flip-flop 14-1 to 14-15 from the MSB to the 17(=32–(21–6))th bit (upper 15 bits), and activates only the flip-flops 14-16 to 14-32 from the 16(=32–(21–6)–1)th bit to the LSB.

As a result, the stored value in the FF 14 becomes 10000100011011000101000000000000B, and the new 6 bit variable length code [001010B] is attached to the 15 bits of data [100001000110110B] which is already a continuous variable length code sequence.

At this stage, a 21 bit variable length code sequence is stored in the FF 14, and the same processing is subsequently repeated. When a 32 bit variable length code sequence has been stored in the FF 14, this 32 bit variable length code sequence (the variable length code is a continuous data sequence of 32 bits) is read and output from the FF 14.

As described above, in the FF 14, a variable length code is attached to a variable length code which is already stored, and the same processing is performed on the new variable length code sequence which is obtained as a result so as to generate a 32 bit variable length code sequence, however the LSB of the 32 bit variable length code sequence is not necessarily identical to the LSB of the variable length code sequence which is added last.

Assume for example that a 31 bit variable length code sequence is already stored in the FF 14 as shown in FIG. 9A, and for example a variable length code of length 6 is input as shown in FIG. 9B to the barrel shifter 6. In FIG. 9, 0 represent valid variable length code (variable length code sequence) bits, and X represent dummy bits (bits in which a valid variable length code (variable length code sequence) is not stored).

In this case, the stored value of the FF 11 is 31, so 31 and 6 are input to the shift adder 9. The addition product of 31 and 6 is 37, however the shift adder 9 comprises 5 bit adders as stated hereinabove, and as the MSB is ignored, 5 (=37−32) is output as the cumulative addition product. As a result, in the barrel shifter 6, the input data is left-shifted by 27 (=32−5) bits as shown in FIG. 9B, and 32 bit shift data is output as shown in FIG. 9C.

This 32 bit shift data is supplied by the barrel shifter 6 to the FF 14 via the selection circuit 13. The LSB of the 32 bit shift data is thereby added to the 31 bit variable length code sequence stored in the FF 14, and a 32 bit variable length code sequence is obtained. The same processing is subsequently performed on the next variable length code, so the upper 5 bits of the 32 bit shift data shown in FIG. 9C, i.e. the remainder of the variable length code, is not included in the variable length code sequence.

When the cumulative addition product of the shift adder 9 is 32 or more bits but only when its output value is less than on the immediately preceding occasion, after the output of the barrel shifter 6 is selected by the selection circuit 13, the microcomputer 15 immediately causes the output of the FF 12 to be selected.

In the aforesaid case, therefore, the LSB of the 32 bit shift data is added to the 31 bit variable length code sequence already stored in the FF 14, and after a 32 bit variable length code sequence is obtained, the selection circuit 13 selects the 32 bit shift data stored in the FF 12 and supplies it to the FF 14 where it is stored. In this way, in the FF 14, the next variable length code is stored after the remaining 5 bit variable length code as shown in FIG. 9C.

Next, the operation of the decoder 14 will be described with reference to FIG. 10–FIG. 14.

FIG. 10 shows a block of the VLC 111 and VLD 203 which operates when decoding is performed.

During decoding, the microcomputer 15 first supplies and stores a decoding table in the coding/decoding table storage unit 8, controls the selection circuit 3 so as to select the output of the FF 2, and controls the selection circuit 7 so as to select the output of the barrel shifter 6.

The read circuit 1 reads a N bit fixed variable length code sequence from the buffer 202, and supplies it to the FF 2 where it is stored. When the variable length code sequence to be decoded has not yet been stored in the FF 4 or when decoding of the variable length code sequence stored in the FF 4 is complete, the N bit variable length code sequence stored in the FF 2 is supplied to the FF 4.

Hence, a current N bit variable length code sequence which is to be decoded is permanently stored in the FF 4, while the next N bit variable length code sequence to be decoded is stored in the FF 2.

In the shift adder 9, the length of the variable length code is cumulatively added by adding the length of the variable length code decoded on the immediately preceding occasion which is stored in the coding/decoding table storage unit 8 to the stored value in the FF 11, i.e. the shift S on the immediately preceding occasion. This cumulative addition product S+s is supplied to the FF 10 and 11. The cumulative addition product stored in the FF 10 is supplied to the selection circuit 5 and barrel shifter 6 as a shift, and the cumulative addition product stored in the FF 11 is supplied to the shift adder 9 so as to compute the next cumulative addition product.

When decoding of the upper i (<N) bits of the N bit fixed variable length code sequence stored in the FF 4 is complete, the remaining N−i bits and the upper i bits in the N bit fixed variable length code sequence stored in the FF 2 are selected based on the shift S+s (herein, S+s=1) supplied by the FF 10, and the selected total N (=(N−i)+i) bits of data are supplied to the barrel shifter 6.

When the barrel shifter 6 receives the shift S+s from the FF 10, the N bits of data from the selection circuit 5 are left-shifted by S+s bits, and the resulting N bits of shift data are supplied to the selection circuit 7. Herein, the variable length code which is currently being decoded is arranged from the MSB of the N bit shift data. In other words, a "header?" of the variable length code to be decoded is prepared in the barrel shifter 6.

As described hereinabove, based on the control of the microcomputer 15, the selection circuit 7 selects the output of the barrel shifter 6, and in this case therefore, N bit shift data is supplied to the coding/decoding table storage unit 8 via the selection circuit 7.

In the coding/decoding table storage unit 8, the N bit shift data from the selection circuit 7 is for example address-decoded, and the run length and level stored in the address, and the length of the variable length code, are read as the decoded result. The run length and level are supplied to the run length/level converter 17, and the length of the variable length code is supplied to the shift adder 9.

In the run length/level converter 17, the run length and level from the coding/decoding table storage unit 8 are converted to a quantized DCT coefficient and supplied to the reverse quantizer 204.

This processing is subsequently repeated, and when decoding of the N bit variable length code sequence stored in the FF 4 is complete, the N bit variable length code sequence stored in the FF 2 is transferred to the FF 4. Also in the read circuit 1, the N bit variable length code sequence to be decoded next is read from the buffer 202, and supplied to the FF 2. This processing is subsequently repeated.

Next, the processing performed during decoding will be described in detail using a specific example.

As in the case of coding, assuming N is 32 (=$2^5$), the shift adder 9 comprises 5 bit adders.

Assume that in the FF 4, the 32 bit variable length code sequence currently stored is for example 01010000100001100101000000010100B, and that the 32 bit variable length code sequence stored in the FF 2 is for example 00000001000001010000011010000000B. Assume also that the cumulative addition product stored in the FF 11 is for example 15, and therefore that decoding of data [010100001000011B] up to the upper 15th bit from the MSB in the variable length code sequence stored in the FF 4 is complete.

Figure 12:
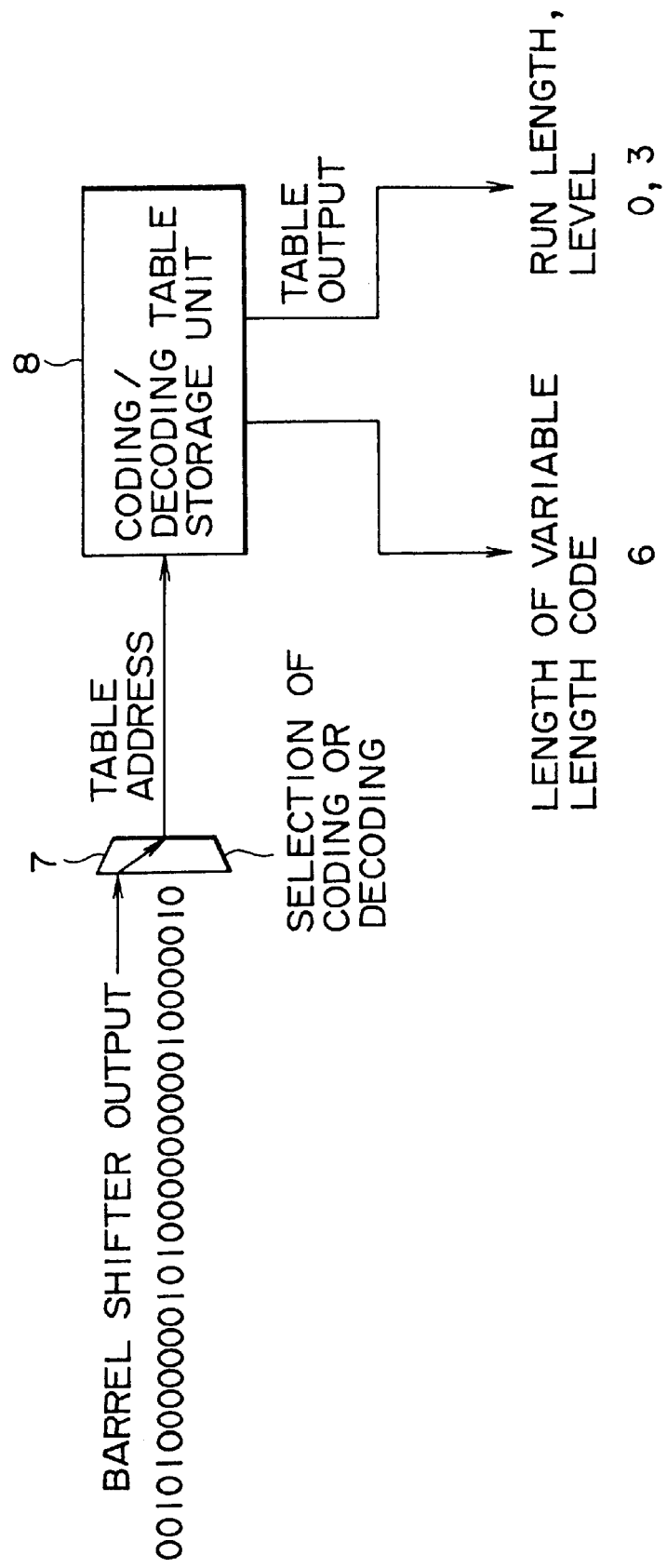
FIG. 12 is a block diagram for describing processing performed during variable length decoding according to the embodiment of FIG. 4.

Assume that for example the 32 bit shift data [00101000000101000000000001000010B] is output from the barrel shifter 6 as shown in FIG. 12, and that a run length and level of respectively 0 and 3, and a length of a variable length code of 6, are obtained by inputting this data to the coding/decoding table storage unit 8 via the selection circuit 7 (therefore at this time, the upper 6 bits [001010B] of the aforesaid 32 bits of data [00101000000101000000001000010B] are variable length decoded, i.e. decoding of the upper 21 bits [010100001000011001010] of the 32 bit variable length code sequence [01010000100001100101000000010100B] stored in the FF 4 is complete).

Figure 11:
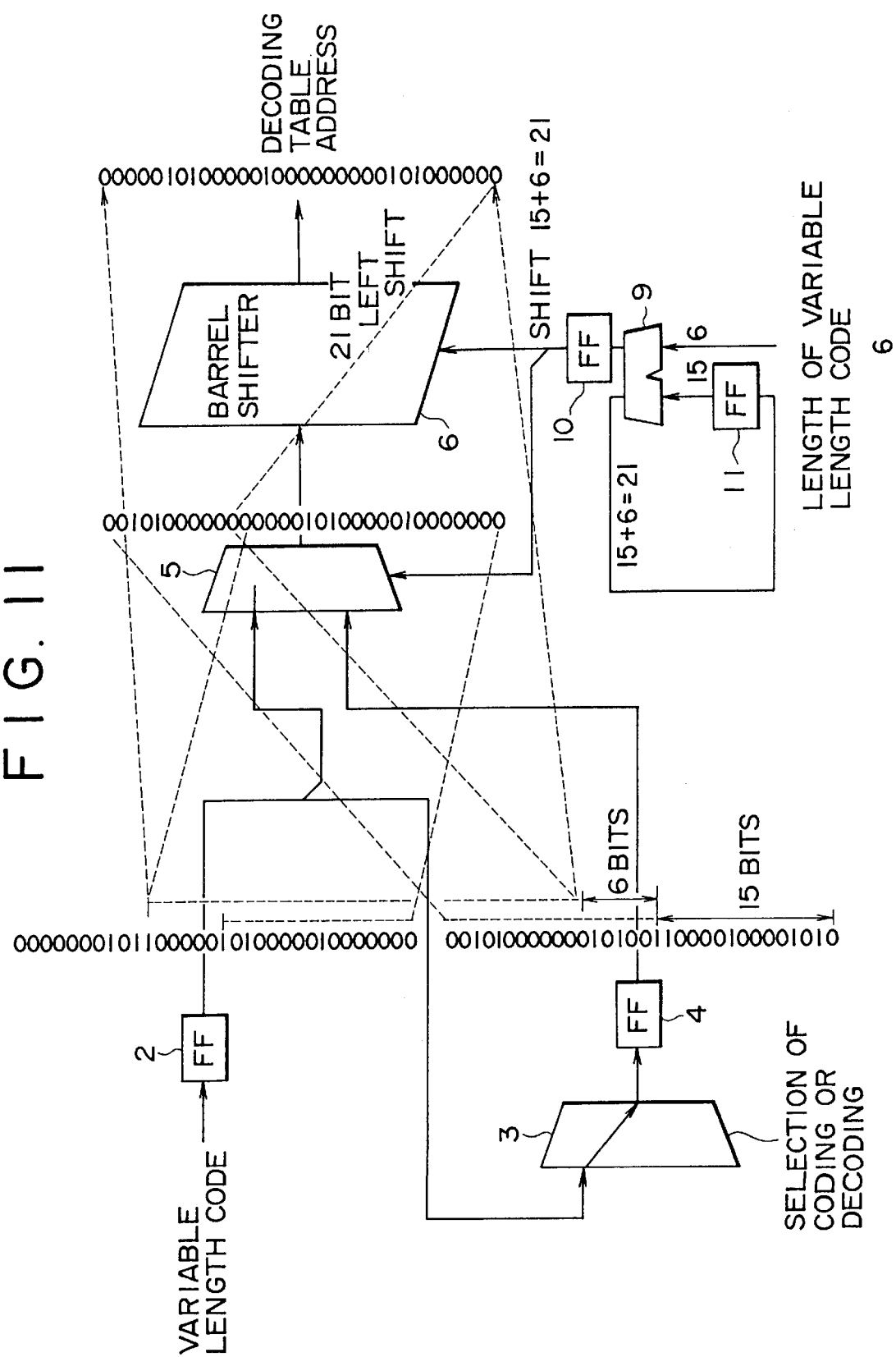
FIG. 11 is a block diagram for describing processing performed during variable length decoding according to the embodiment of FIG. 4.

In this case, as shown in FIG. 11, the length of the variable length code, [6], is supplied to the shift adder 9 by the coding/decoding table storage unit 8, and the length of the variable length code is cumulatively added by adding the length [6] of the variable length code and the stored value [15] of the FF 11. This cumulative addition product [21 (=15+6)] is supplied to the FF's 10 and 11 where it is stored. The cumulative addition product stored in the FF 10 is supplied to the selection circuit 5 and barrel shifter 6 as a shift, and the cumulative addition product stored in the FF 11 is supplied to the shift adder 9 in order to compute the next cumulative addition product.

In this case the selection circuit 5 verifies, by referring to the output value from the FF 10, that variable length decoding of the upper 21 bits [010100001000011001010] of the 32 variable length code sequence [01010000100001100101000000010100B] stored in the FF 4 is complete, and selects the remaining lower 11 (=32−21) bits, i.e. [00000010100B]. The selection circuit 5 also selects 21 bits, which is the output value of the FF 10, from the MSB of the 32 bit variable length code sequence [00000001000001010000011010000000B] stored in the FF 2, and by adding the 11 bits selected from the FF 4 to the 21 bits selected from the FF 2, 32 bits of data, i.e. [00000001000001010000000000000100B] are generated.

Figure 13:
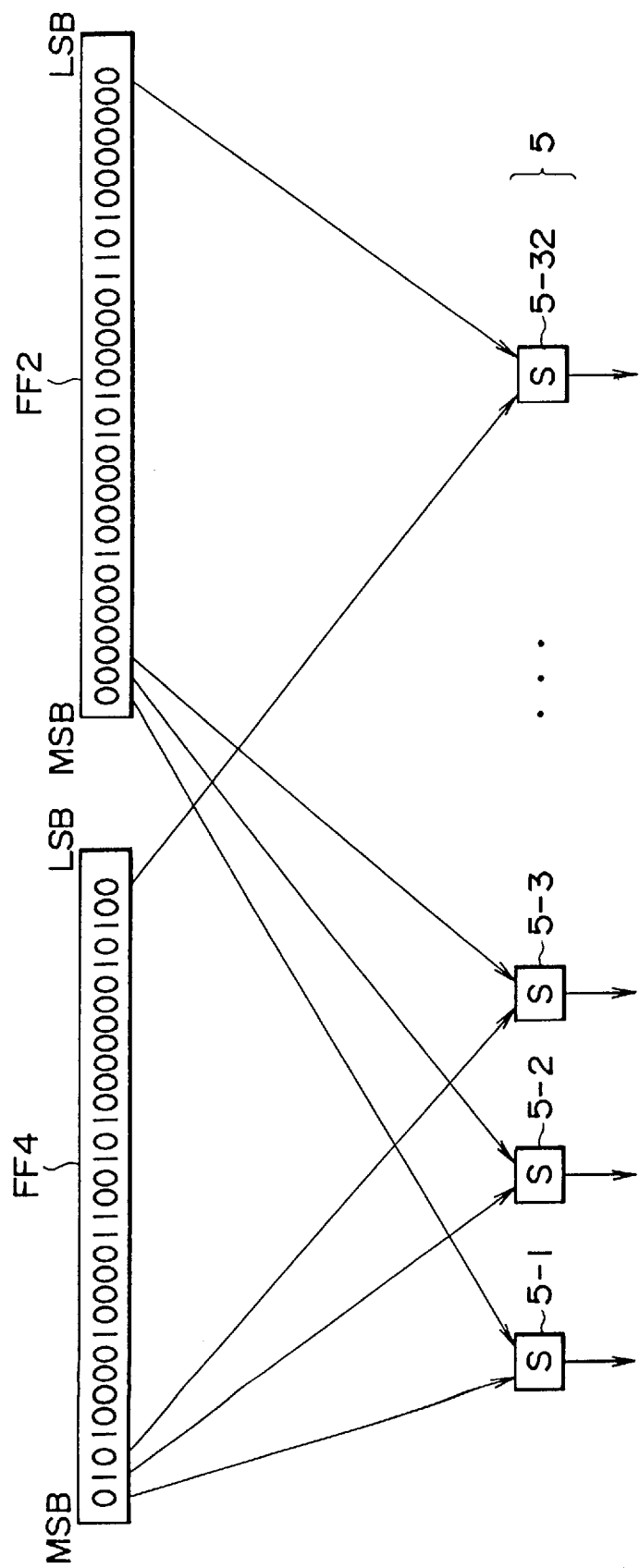
FIG. 13 is a block diagram showing a typical layout of a selection circuit 5 in FIG. 4.

FIG. 13 shows a typical layout of the selection circuit 5. The selection circuit 5 comprises N, and in this case 32, selectors S, i.e. 5-1 to 5-32, and the jth bit from the MSB of the FF 4 and the jth bit from the MSB of the FF 2 are input to the selector 5-j. In principle, of the jth bits from the MSB of the FF 2 or the FF 4, it is the jth bit in the FF 4 which is selected and output, however when the jth bit from the MSB of the FF 4 has already been decoded, the jth bit in the FF 2 is selected.

When the output value of the FF 10 is 21, i.e. when decoding of the upper 21 bits of the 32 bit variable length code sequence stored in the FF 4 is complete, the FF 2 is selected in the selectors 5-1 to 5-21, and the FF 4 is selected in the selectors 5-22 to 5-32. In this way, as described hereinabove, 32 bits of data, i.e. [00000001000001010000000000010100B] comprising the lower 11 bits of the FF 4 added to the upper 21 bits of the FF 2, is output by the selection circuit 5.

Herein, for convenience, the data selected by the FF 2 and the data selected by the FF 4 will both be denoted by the symbol " (e.g., the aforesaid 32 bits of data, [00000001000001010000000000000100B], will be represented as ["000000010000010100000B" "00000010100B"].

The 32 bits of data output by the selection circuit 5 is supplied to the barrel shifter 6 and stored.

When the barrel shifter 6 receives the shift [21] from the FF 10, the stored 32 bits of data are left-shifted by a number of bits corresponding to the shift [21]. In this case, data left-shifted by 21 bits, i.e. ["00000010100B" "000000010000010100000B"], is thereby obtained from the data ["000000010000010100000B" "00000010100B"] output by the selection circuit 5.

As described hereinabove, decoding of the upper 21 bits of the 32 bits of data stored in the FF 4 is complete, therefore it is the 32 bits of data [00000010100000000010000010100000B], comprising the 11 bits of data [00000010100B] remaining in the FF 4 and the following upper 21 bits of data [000000010000010100000B] in the FF 2, which should now be decoded.

As described hereinabove, in the selection circuit 5, 21 and 11 bits are respectively selected from the FF 2 and FF 4, and the 32 bits of data now to be decoded (data with a header?), [00000010100000000010000010100000B], is obtained by applying a bit shift in the barrel shifter 6 to this selected data.

The data resulting from bit shift in the barrel shifter 6 is supplied to the coding/decoding table storage unit 8 via the selection circuit 7.

Figure 14:
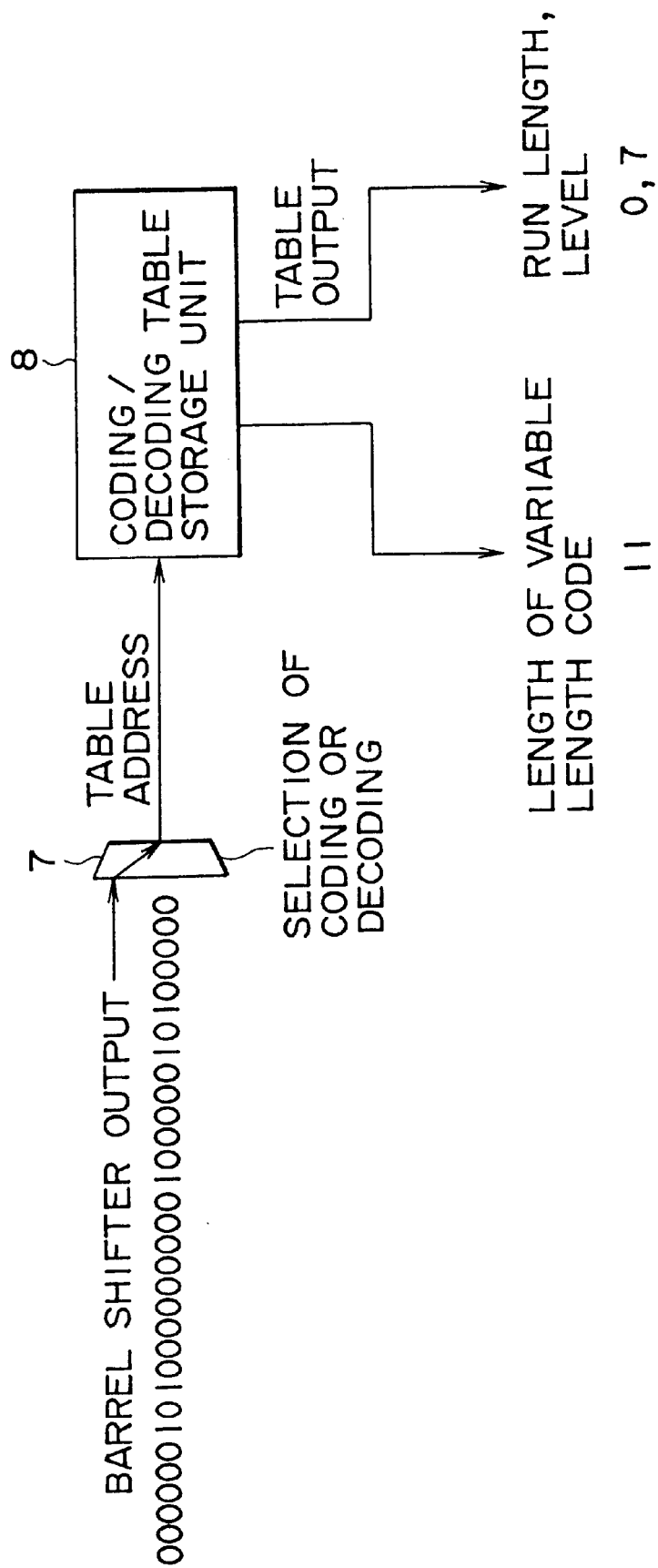
FIG. 14 is a block diagram for describing processing performed during variable length decoding according to the embodiment of FIG. 4.

In the coding/decoding table storage unit 8, the 32 bits of data (shift data) supplied via the selection circuit 7 is address-decoded, and the run length and level stored in this address together with the length of the variable length code are read as the decoded result. In this case therefore, as shown in FIG. 14, 0 and 7 are output as the run length and level, and 11 is output as the length of the variable length code, corresponding to the data [00000010100000000010000010100000B] supplied via the selection circuit 7.

The run length and level are supplied to the run length/level converter 17, and are therein converted to a DCT coefficient. The length of the variable length code is supplied to the shift adder 9, and the same processing is subsequently repeated.

When the output value is smaller than the value on the immediately preceding occasion due to a cumulative addition product of 32 or more in the shift adder 9, i.e. when variable length decoding of the 32 bit variable length code sequence stored in the FF 4 is complete, the microcomputer 15 controls the FF 2 so that the data stored therein is transferred to the FF 4 via the selection circuit 3, and is stored in the FF 4. The microcomputer 15 controls the read circuit 1 so as to read the next 32 bit variable length code sequence from the buffer 202, supply it to the FF 2 and store it therein. The same processing is subsequently repeated.

Since variable length encoding and variable length decoding are performed by one barrel shifter 6 as described above, the processor can be made more compact and manufactured at lower cost.

Also, the current variable length code sequence to be decoded is stored in the FF 4 while the next variable length code sequence to be decoded is stored in the FF 2, so decoding can be accomplished without using a barrel shifter 6 of such large bit number capacity (e.g. 64 bits).

The above invention has been described in the context of its application to image encoders and decoders which perform image coding and decoding of images based on MPEG, however it may also be applied to coding and decoding of images based on specifications other than MPEG such as H.261. It maybe applied also to coding and decoding of data other than images such as for example sound, etc.

Moreover the description of this embodiment has focused on variable length coding/variable length decoding of macroblocks, however the invention may be applied also to variable length coding/variable length decoding of motion vectors or quantized step width.

Further, according to this embodiment, a variable length code sequence was read by the read circuit 1 in units of N bits where N is the number of bits in the barrel shifter 6, however reading of variable length code sequences may be performed in units of less than N bits.

According to this embodiment, the number of bits in the barrel shifter 6 was 32, however the number of bits in the barrel shifter 6 may be determined for example based on the number of bits in the variable length code sequence read by the read circuit 1.

Figure 15:
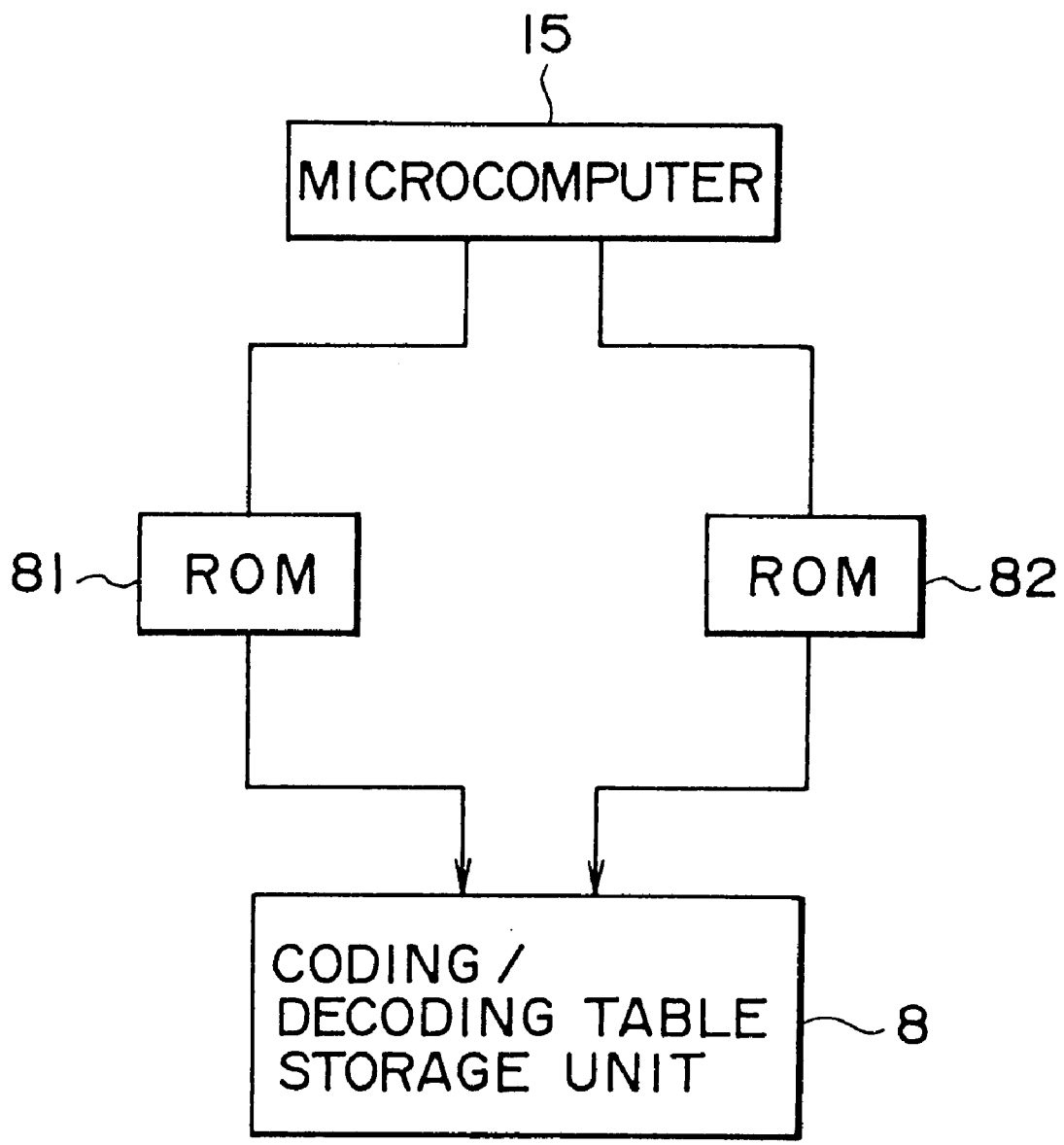
FIG. 15 is a block diagram describing updating performed by a coding/decoding table storage unit 8 in FIG. 4.
Figure 16:
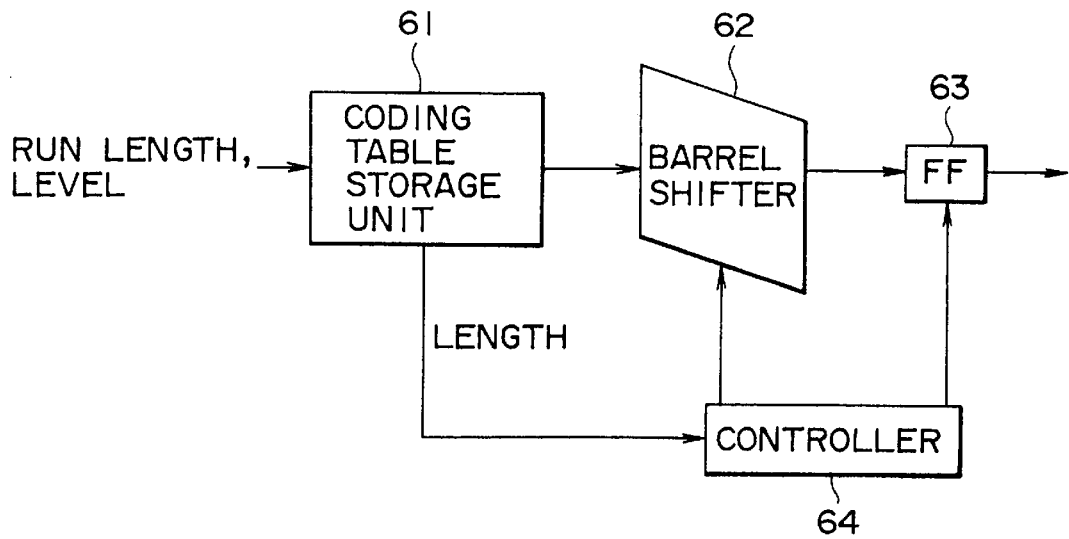
FIG. 16 is a block diagram showing a typical layout of a conventional VLC.
Figure 17:
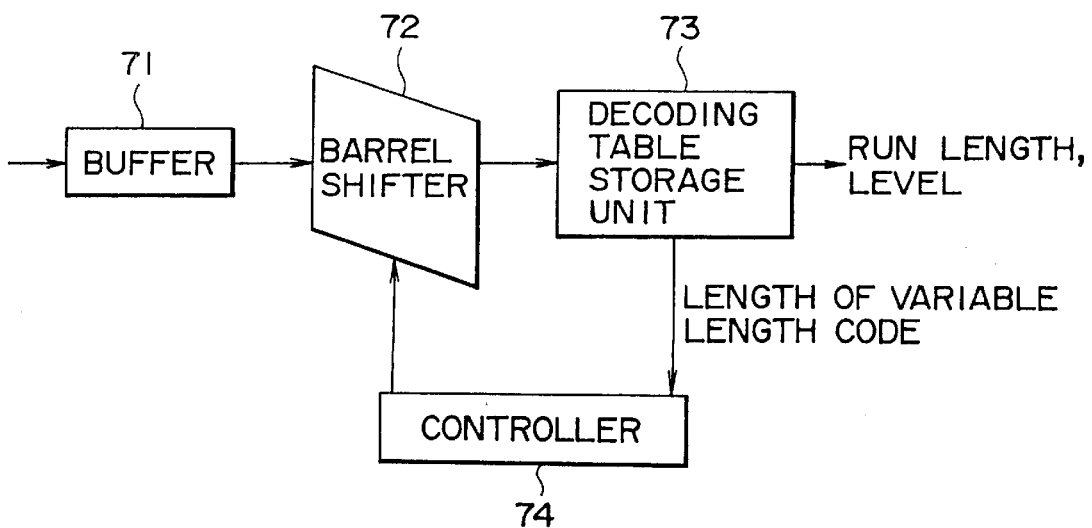
FIG. 17 is a block diagram showing a typical layout of a conventional VLD.

Further, updating of the aforesaid coding/decoding table storage unit 8 may for example be performed as shown in FIG. 15. In other words, a ROM (Read Only Memory) 81 for storing the coding table, and a ROM 82 for storing the decoding table may be provided, the stored contents of the ROM 81 transferred to the coding/decoding table storage unit 8 and stored therein for coding, and the stored contents of the ROM 82 transferred to the coding/decoding table storage unit 8 and stored therein for decoding.

To make processing more rapid, a VLC having two barrel shifters is proposed in for example Japanese Publication No. Hei 5-259922. Likewise, a VLD having two barrel shifters is proposed in for example, Ming-Ting Sun and Shaw-Min Lei, "A HIGH SPEED ENTROPY DECODER FOR HDTV", IEEE 1992 CUSTOM INTEGRATED CIRCUITS CONFERENCE, "ISSCC94/SESSION 4/VIDEO AND COMMUNICATION SIGNAL PROCESSORS/PAPER WP 4.6", 1994 IEEE International Solid State Circuits Conference, Sato et al, [VLSI IMPLEMENTATION OF MPEG2 MOVING IMAGE CODEC], EDA Technofare 95, University Plaza, University Laboratory Research Reports, and Komoto, Seguchi, [DEVELOPMENT OF LSI FOR 110 MHz MPEG2 COMPLIANT VARIABLE LENGTH CODES], Journal of Institute of Electronics and Information Communications Engineers, TECHNICAL REPORT OF IEICE, ICD94-86 (1994-08). In the same way, two stages may also be provided in the VLC 111 and VLC 203 of FIG. 4.

According to this embodiment, the barrel shifter 6 was left-shifted in the case of both coding and decoding, however the barrel shifter 6 may be shifted either to the left or right by changing the shift amount.

According to this embodiment, data encoded in the image encoder 51 is recorded on the recording medium 2, and data recorded on the recording medium 2 was decoded by the image decoder 53. However this invention may additionally be applied to for example the case where data encoded in the image encoder 51 is transferred via a CATV network or satellite circuit, or where data transferred in this way is decoded by the image decoder 53.

In the processor and image processor for processing variable length codes according to this invention, a run length and level are input, and a variable length code output by a first memory for storing a variable length coding table which outputs variable length codes is bit-shifted according to its length in a first shifter. In a second shifter, a variable length code to be decoded is bit-shifted according to the length of the variable length code decoded on the immediately preceding occasion, and is supplied as input to a second memory for storing a variable length decoding table which outputs run lengths and levels. The first and second shifters are identical. The processor can therefore be made more compact and can be manufactured more economically.

It will of course be understood that various modifications and applications are possible within the scope and spirit of this invention, and the invention is therefore not limited to this embodiment.

What is claimed is:

1. A variable length code processor for encoding data into a variable length code corresponding to its run length and level, and decoding said variable length code into said corresponding run length and level, said variable length code processor comprising:

a first memory for storing a variable length coding table for outputting said variable length code using said run length and level as input, a second memory for storing a variable length decoding table for outputting said run length and level using said variable length code as input, and a shifter having a first and second mode, wherein said shifter in the first mode applies a bit shift to said variable length code output by said first memory based on the length of said variable length code, and said shifter in the second mode applies a bit shift to said variable length code to be decoded based on the length of said variable length code decoded on the immediately preceding occasion, and supplies the bit-shifted variable length code to said second memory as input.

2. A variable length code processor as defined in claim 1, wherein said first and second memory are one and the same.

3. A variable length code processor as defined in claim 1, wherein said shifter performs a bit shift in N bit units of data, said variable length code processor further comprising:

a first variable length code memory for temporarily storing a variable length code of N bits which is currently being decoded, a second variable length code memory for temporarily storing a variable length code of N bits which is to be decoded next, and a selector for selecting a remaining N-i bits in said first variable length code memory and an upper i bits in said N bit variable length code stored in said second memory when the upper i bits in said N bit variable length code stored in said first variable length code memory are decoded, and supplying these to said shifter when said shifter is operating in said second mode.

4. A variable length code processor as defined in claim 3, wherein:

when the decoding of said N bit variable length code stored in said first memory is complete, said N bit variable length code stored in said second memory is transferred to said first variable length code memory, and said variable length code of N bits which is to be decoded next is stored in said second variable length code memory.

5. A variable length code processor as defined in claim 1, further comprising a K bit adder for cumulative addition of the length of said variable length code, wherein:

said shifter performs a $2^K$ bit unit data bit shift based on a cumulative addition result in said adder.

6. A variable length code processor as defined in claim 1, wherein said first and second table memories are rewritable.

7. A variable length code processor for encoding image data into a variable length code, and decoding said variable length code into said image data comprising:

a first processing circuit for processing said image data, and outputting run length and level of the image data from the processing result, a variable length code processing circuit for either outputting a variable length code corresponding to said run length and level output by said first processing circuit or outputting said run length and level corresponding to said variable length code, and a second processing circuit for processing said run length and level output by said variable length code processing circuit, and outputting said image data, wherein:
said variable length code processing circuit comprises:
a first memory for storing a variable length coding table for outputting said variable length code using said run length and level as input,
a second memory for storing a variable length decoding table for outputting said run length and level using said variable length code as input, and
a shifter having a first and second mode, wherein said shifter in the first mode applies a bit shift to said variable length code output by said first memory based on the length of said variable length code, and said shifter in the second mode applies a bit shift to said variable length code to be decoded based on the length of said variable length code decoded on the immediately preceding occasion, and supplies the bit-shifted variable length code to said second memory as input.

8. A variable length code processor as defined in claim 7, wherein said first and second memory are one and the same.

9. A variable length code processor as defined in claim 1, wherein said shifter is a barrel shifter.

10. A variable length code processor as defined in claim 7, wherein said shifter is a barrel shifter.

11. A variable length code processor as defined in claim 2, further comprising a coding/decoding table selector for downloading either said variable length coding table or said variable length decoding table into said memory.

12. A variable length code processor as defined in claim 8, further comprising a coding/decoding table selector for downloading either said variable length coding table or said variable length decoding table into said memory.

13. A variable length code processor as defined in claim 11, wherein said table selector comprises:
a microprocessor;
a coding table memory for storing said variable length coding table; and
a decoding table memory for storing said variable length decoding table,
wherein said microprocessor selects either the coding table memory or the decoding table memory for downloading respective tables stored therein into said memory.

14. A variable length code processor as defined in claim 13, wherein said coding table memory and said decoding table memory are non-volatile memories.

15. A variable length code processor as defined in claim 8, wherein said table selector comprises:
a microprocessor;
a coding table memory for storing said variable length coding table; and
a decoding table memory for storing said variable length decoding table,
wherein said microprocessor selects either the coding table memory or the decoding table memory for downloading respective tables stored therein into said memory.

16. A variable length code processor as defined in claim 15, wherein said coding table memory and said decoding table memory are non-volatile memories.

17. A variable length code processor for encoding image data into a variable length code, and decoding said variable length code into said image data comprising:
a processing circuit for processing said image data and outputting run length and level of the image data from the processing result;
a variable length code processing circuit operable in either a coding mode for outputting a variable length code corresponding to said run length and level output by said first processing circuit or a decoding mode for outputting said run length and level corresponding to said variable length code; and
a converting circuit for processing said run length and level output by said variable length code processing circuit, and reconstructing said image data, wherein said variable length code processing circuit comprises:
a table memory for storing either a variable length coding table for outputting said variable length code using said run length and level as input in said coding mode of operation, or a variable length decoding table for outputting said run length and level using said variable length code as input in said decoding mode of operation,
a shifter which applies either a bit shift to said variable length code output by said table memory based on the length of said variable length code in said coding mode of operation, or a bit shift to said variable length code to be decoded based on the length of said variable length code decoded on the immediately preceding occasion, and supplies the bit-shifted variable length code to said table memory as input in said decoding mode of operation, and
a mode selector for selecting whether said variable length code processor operates in said coding mode of operation or said decoding mode of operation and providing either said variable length coding table or said variable length decoding table to said table memory based on the selected mode of operation.

18. A variable length code processor as defined in claim 17, wherein said mode selector comprises:
a microprocessor;
a coding table memory for storing said variable length coding table; and
a decoding table memory for storing said variable length decoding table,
wherein said microprocessor selects either the coding table memory or the decoding table memory for downloading respective tables stored therein into said table memory.

19. A variable length code processor as defined in claim 18, wherein said coding table memory and said decoding table memory are non-volatile memories.

20. A variable length code processor as defined in claim 17, wherein said table memory is rewritable.

* * * * *